(12) United States Patent
Allsop et al.

(10) Patent No.: US 7,004,491 B1
(45) Date of Patent: Feb. 28, 2006

(54) WEDGE TIGHTENING DEVICES FOR HITCH ASSEMBLIES

(75) Inventors: James D. Allsop, Bellingham, WA (US); Eivind Clausen, Bellingham, WA (US)

(73) Assignee: Allsop, Inc., Bellingham, WA (US)

( * ) Notice: Subject to any disclaimer, the term of this patent is extended or adjusted under 35 U.S.C. 154(b) by 0 days.

(21) Appl. No.: 10/830,711

(22) Filed: Apr. 22, 2004

Related U.S. Application Data

(60) Provisional application No. 60/465,023, filed on Apr. 22, 2003.

(51) Int. Cl.
*B60D 1/00* (2006.01)

(52) U.S. Cl. .................... 280/506; 280/491.2
(58) Field of Classification Search ............ 280/491.2, 280/491.5
See application file for complete search history.

(56) References Cited

U.S. PATENT DOCUMENTS 5,344,175 A * 9/1994 Speer .......................... 280/506
5,423,566 A * 6/1995 Warrington et al. ..... 280/415.1

* cited by examiner

*Primary Examiner*—Lesley D. Morris
*Assistant Examiner*—L. Lum
(74) *Attorney, Agent, or Firm*—Christensen O'Connor Johnson Kindness PLLC

(57) ABSTRACT

Several embodiments of hitch receiver attachment structures are provided, which are adapted for interconnection with a conventional vehicle hitch receiver. The hitch receiver attachment structures include mechanisms that reduce or eliminate undesirable play or movement between the hitch receiver attachment structure and the hitch receiver during use.

22 Claims, 10 Drawing Sheets

WEDGE TIGHTENING DEVICES FOR HITCH ASSEMBLIES

CROSS-REFERENCE(S) TO RELATED APPLICATION(S)

The present application claims the benefit of U.S. Provisional Application No. 60/465,023, filed Apr. 22, 2003, the disclosure of which is hereby incorporated by reference.

FIELD OF THE INVENTION

The present invention relates to hitch assemblies for vehicles, and more particularly, to hitch assemblies having interconnection tightening devices for reducing or eliminating play between respective components of the hitch assembly.

BACKGROUND OF THE INVENTION

Many vehicles today are equipped with receiver-type trailer hitches. Typically, these types of trailer hitches include a square receiver tube, normally 1 and ½ or 2 inches in internal height and width, attached to the undercarriage of the vehicle. A second slide tube, which acts as a shank, includes outer dimensions slightly smaller than the internal dimensions of the receiver tube so that it may be slideable within the receiver tube. Once inserted, the slide tube is connected to the receiver tube by a fastener inserted through the two tubes to prevent relative movement therebetween.

The slide tube may include a standard ball-mount for engaging with the hitch of a trailer or other wheeled vehicle. Another popular use for receiver hitches is the use as a coupling device for installing equipment racks onto the vehicle. Bicycle carrier racks, ski carriers, storage boxes and other types of carriers have been designed to use the above-described hitch slide tube to engage within a receiver hitch tube. This provides a universal system that allows a vehicle user to be able to use various trailers and carriers with a single coupling system.

One particular problem with the use of these conventional hitch assemblies is the clearance between the internal dimensions of the receiver tube and the external dimensions of the slide tube. These tubes by necessity must have sufficient clearance therebetween so that the slide tube is efficiently and easily telescopingly received within the receiver tube. However, this clearance between the two tubes causes relative movement therebetween, which potentially results in a slide tube that rattles or chatters within the receiver tube during use. This rattle or chatter is at best an annoyance and at worst can distract the driver or cause damage to the trailer or the carrier.

SUMMARY OF THE INVENTION

In accordance with aspects of the present invention, a hitch receiver attachment assembly for use in a hitch assembly is provided. The hitch receiver attachment assembly includes a hitch receiver attachment structure having a generally rectangular cross-section. The hitch receiver attachment structure includes one truncated corner that defines a planar contact surface that is slanted with respect an adjacent side wall surface. The hitch receiver attachment assembly further includes a wedge member having an outwardly facing engagement surface configured to be cooperatively received within one corner of a hitch receiver tube and an inwardly facing planar guide surface adapted to contact the slanted contact surface of the hitch receiver attachment structure during use.

In accordance with another aspect of the present invention, a hitch assembly is provided. The hitch assembly includes a hitch receiver tube defining a generally rectangular socket and a hitch receiver slide structure having a generally rectangular cross-section of suitable dimensions to loosely translate within the hitch receiver tube socket. The hitch receiver slide structure includes one truncated corner that defines a planar contact surface that is slanted with respect an adjacent side wall surface. The hitch assembly further includes a wedge member having an outwardly facing engagement surface configured to be cooperatively received within one corner of the hitch receiver tube socket and an inwardly facing planar guide surface adapted to contact the slanted contact surface of the hitch receiver slide structure during use, and a coupling assembly that selectively couples the hitch receiver slide structure to the hitch receiver tube in a secure manner. The coupling assembly is capable of clamping the hitch receiver slide structure between the wedge member and one of the hitch receiver tube side walls.

In accordance with still another aspect of the present invention, a method for reducing or eliminating undesirable play or movement between a hitch receiver slide structure and a hitch receiver tube of a hitch assembly is provided. In the method, a hitch receiver tube defining a generally rectangular socket and a hitch receiver slide structure having a generally rectangular cross-section of suitable dimensions to loosely translate within the socket of the hitch receiver tube are provided. The hitch receiver slide structure includes one truncated corner that defines a planar contact surface. The method also provides a wedge member having an outwardly facing engagement surface configured to be cooperatively received within one corner of the hitch receiver tube socket and an inwardly facing planar guide surface adapted to contact the contact surface of the hitch receiver slide structure during use. The hitch receiver slide structure and the wedge member are inserted into the socket of the hitch receiver tube, and the hitch receiver slide structure is selectively coupled to the hitch receiver tube in a secure manner.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 8 depicting the hitch receiver attachment structure being loosely secured within the hitch receiver and FIG. 9 depicting the hitch receiver attachment structure being tightly secured within the hitch receiver;

DETAILED DESCRIPTION OF THE PREFERRED EMBODIMENTS

The present invention will now be described with reference to the accompanying drawings where like numerals correspond to like elements. The present invention is directed to hitch assemblies configured to reduce or eliminate undesirable movement between a vehicle's hitch receiver and hitch receiver attachment structures. Specifically, the present invention is directed to hitch receiver attachment structures adapted for interconnection with a conventional vehicle hitch receiver, and including mechanisms that reduce or eliminate undesirable play or movement between the hitch receiver attachment structure and the hitch receiver.

Figure 1:
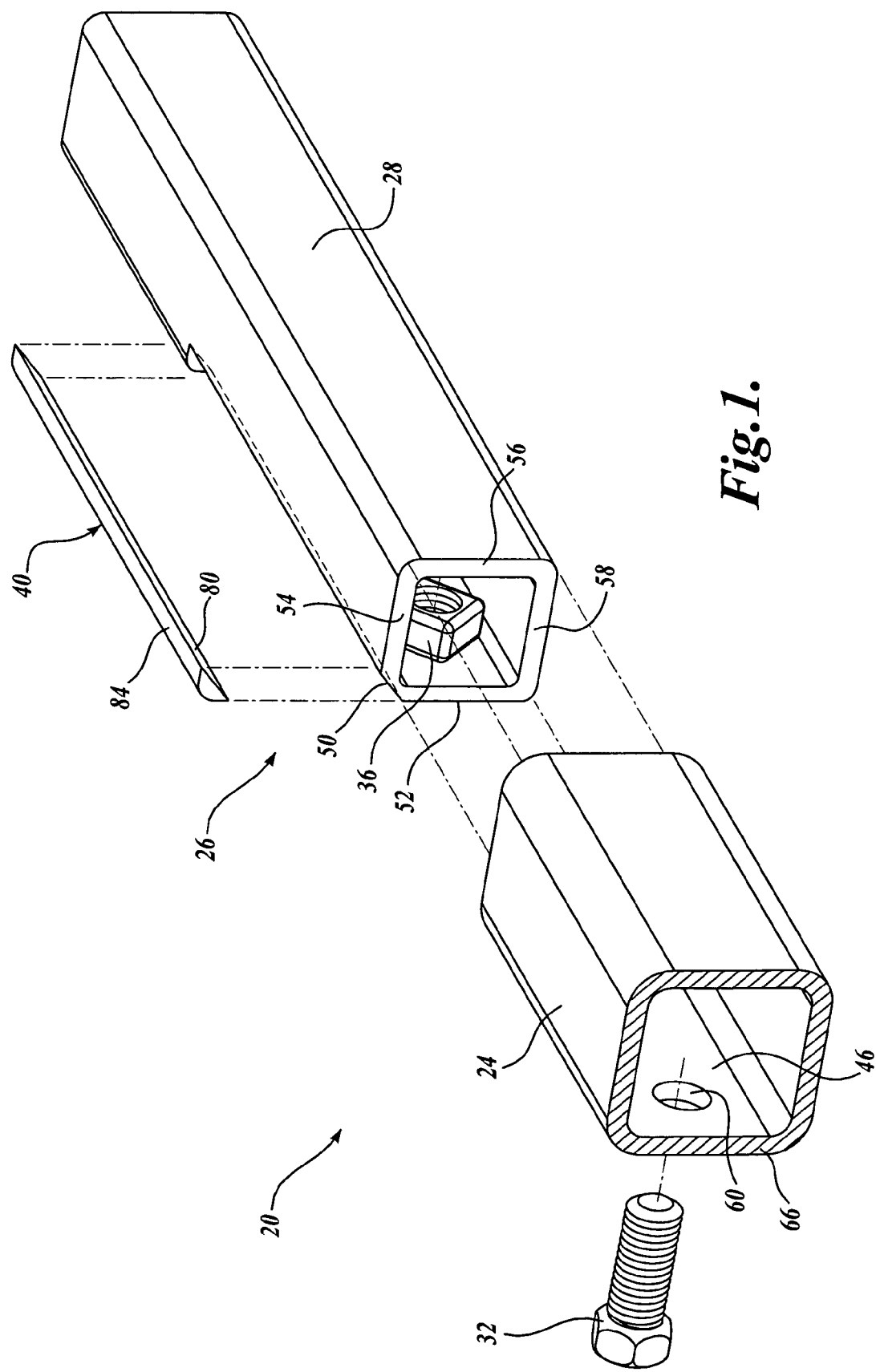
FIG. 1 is an exploded perspective view of one embodiment of a hitch assembly constructed in accordance with aspects the present invention.

Referring now to FIG. 1, a perspective view of one embodiment of a hitch assembly 20 constructed in accordance with the present invention is shown for reducing or eliminating undesirable play or movement between its components. The hitch assembly 20 includes a conventional hitch receiver 24 and a hitch receiver attachment assembly 26 adapted to be telescopingly inserted into the hitch receiver 24 and capable of reducing or eliminating undesirable movement therebetween during use. The hitch receiver attachment assembly 26 includes a hitch receiver attachment structure 28, sometimes referred to as a slide structure, a fastener or coupling assembly composed of a threaded fastener 32 and an internally threaded sleeve or nut 36, for selectively securing the hitch receiver attachment structure 28 to the hitch receiver 24, and a wedge member 40 that operates in conjunction with the fastener assembly to reduce or eliminate movement, horizontal and/or vertical, between the hitch receiver attachment structure 28 and the hitch receiver 24 when securely interconnected. Each of the components of the hitch assembly 20 will now be described in greater detail.

The hitch receiver 24 is a tube-like sleeve structure, preferably constructed of a metallic material, having a generally rectangular interior opening 46. The hitch receiver 24 is adapted to be mounted to the rear bumper region of a vehicle (not shown) to provide an open-ended socket for receiving the hitch receiver attachment structure 28 or the like within the interior opening 46. In the embodiment illustrated in FIGS. 1–5, the hitch receiver attachment structure 28 is likewise tube-like, having an exterior shape corresponding to the interior opening 46, except at one corner where material is removed to leave a substantially planar contact surface 50 that is inclined with respect to adjacent side walls 52 and 54 (i.e., one corner is truncated). The cross-sectional dimensions of the hitch receiver attachment structure 28 are slightly smaller as compared to the interior opening 46 of the hitch receiver 24 so that the hitch receiver attachment structure 28 may be loosely telescopingly received within the hitch receiver 24.

Figure 2:
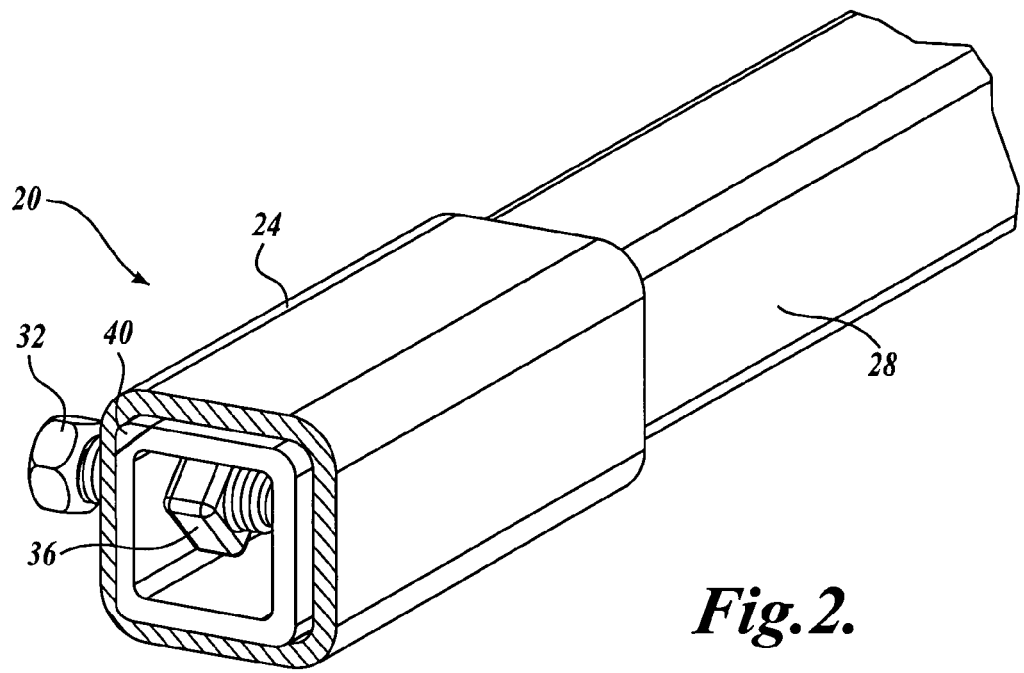
FIG. 2 is a perspective view of the hitch assembly shown in FIG. 1 in an assembled state.
Figure 3:
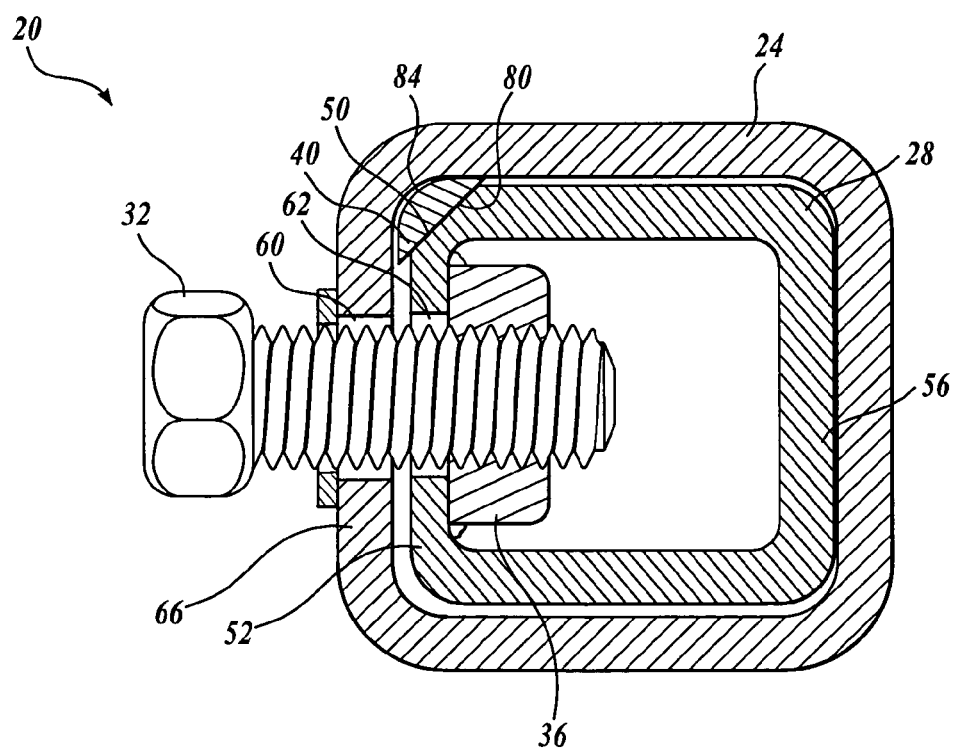
FIG. 3 is a cross sectional view of the hitch assembly of FIG. 2, wherein the hitch receiver attachment structure is loosely secured within the hitch receiver.

In the embodiment shown in FIGS. 1–5, the side wall 52 is thinner than its opposed side wall 56 to provide space between the side walls 52 and 56 and the interior surface of the hitch receiver 24 so that the hitch receiver attachment structure 28 may slide laterally in both directions once inserted into the hitch receiver 24, as best shown in FIG. 3. However, it will be apparent that other side walls or combinations of side walls may have different thicknesses to achieve the same result, or the thicknesses of the side walls may be identical but the overall perimeter dimension is sufficiently reduced for the intended purpose described herein.

As best shown in FIGS. 1 and 3, the hitch receiver 24 and the hitch receiver attachment structure 28 are provided with apertures 60 and 62, respectively, to permit insertion of the threaded fastener 32 of the fastener assembly. In the embodiment shown in FIGS. 1 and 3, the aperture 60 is provided through a side wall 66 of the hitch receiver 24 and is slightly oversized for the fastener used so that the fastener 32 can move laterally as well as longitudinally when assembled. Similarly, the aperture 62 is provided through side wall 52 of the hitch receiver attachment structure 28 so that the apertures 60 and 62 align when the hitch receiver attachment structure 28 is inserted into the hitch receiver 24. In one embodiment, the hitch receiver 24 and the hitch receiver attachment structure 28 are provided with alignable apertures (not shown) disposed in the side walls opposite the apertures 60 and 62 so that the fastener 32 may extend through both opposite side walls, and may be locked in the assembled position by any known locking mechanism for preventing the hitch receiver attachment structure 28 from being removed from the hitch receiver 24.

Figure 6:
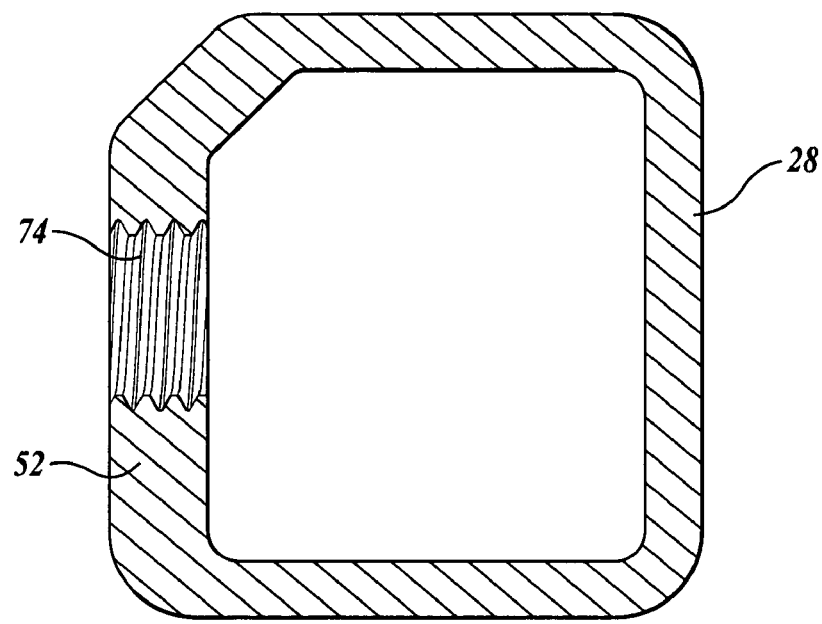
FIG. 6 is a cross-sectional view of an alternative embodiment of the hitch receiver attachment structure.
Figure 7:
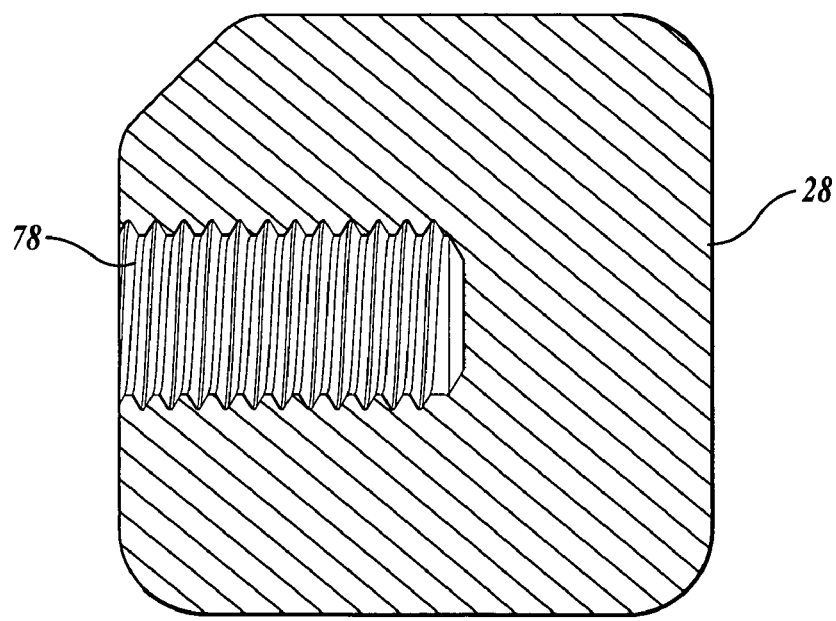
FIG. 7 is a cross-sectional view of another alternative embodiment of the hitch receiver attachment structure.
Figure 10:
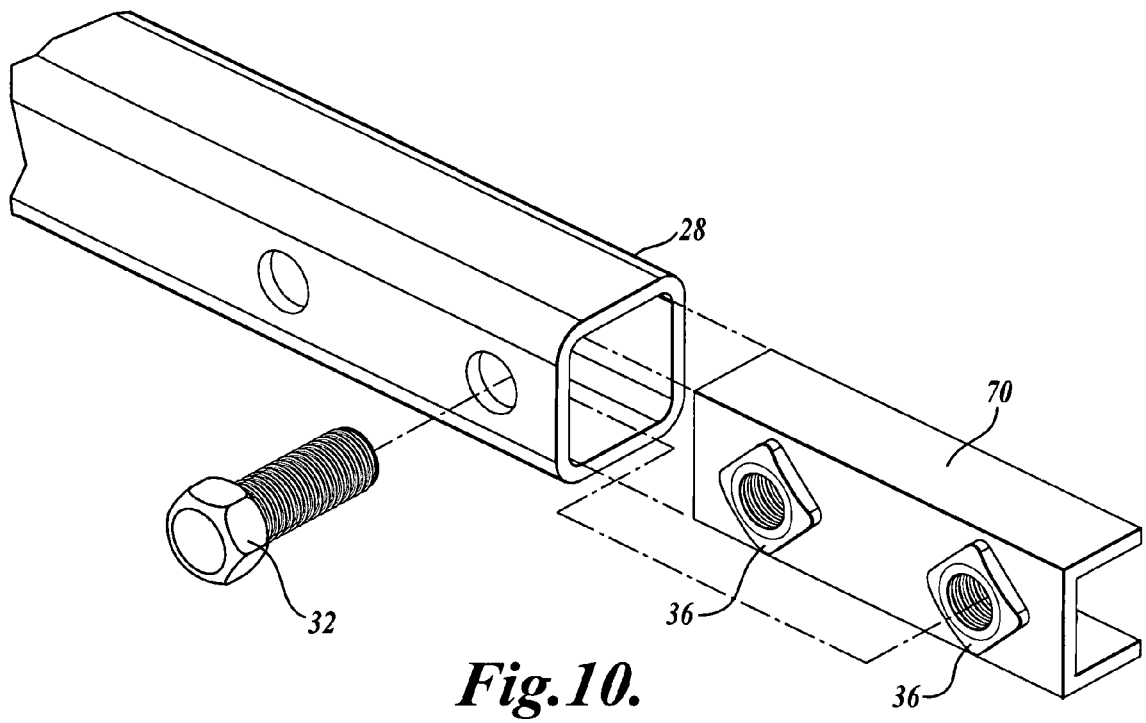
FIGS. 10 and 11 are perspective views of a nut plate insertable into the interior of the hitch receiver attachment structures of FIGS. 1–5, 8, and 9.
Figure 11:
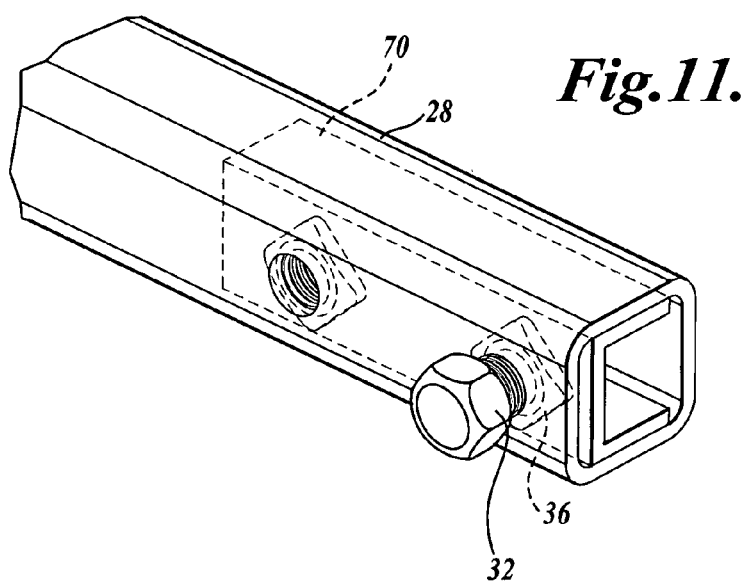

The fastener assembly further includes coupling structure, such as a threaded sleeve or nut 36 having an internal threaded bore. The nut 36 is positioned adjacent side wall 52 and in coaxial alignment with the aperture 62. The nut 36 is prevented from rotating by, for example, fixedly securing the nut to the inside surface of side wall 52 of the hitch receiver attachment structure 28 by, for example, welding, or the nut 36 may be fixedly secured to a plate 70 that slides within the interior opening of the hitch receiver attachment structure 28, as best shown in FIGS. 10 and 11. Alternatively, the side wall 52 may define an internally threaded bore 74, as best shown in FIG. 6. In some embodiments, it may be preferable to increased the width of the side wall that defines the internally threaded bore 74 so that the bore 74 may include additional threads. In other embodiments of the present invention, the hitch receiver attachment structure 28 may be a solid structure having an internally threaded bore 78 configured to cooperate with the threaded fastener, as best shown in FIG. 7.

The hitch assembly 20 further includes a wedge member 40. The wedge member 40 is an elongated structure with a generally triangular cross-section. The wedge member 40 includes a substantially planar, inwardly facing contact surface 80 adapted to contact the contact surface 50 of the hitch receiver attachment structure 28 and an outward facing engagement surface 84 that corresponds in shape with one interior corner of the hitch receiver 24 for engagement therewith. The wedge member 40 may be selectively attached to the hitch receiver attachment structure 28 for ease of inserting both members together into the interior opening 40 of the hitch receiver 24. The selective attachment between the wedge member 40 and the hitch receiver attachment structure 28 is such that the wedge member 40 may slide with respect to the hitch receiver attachment structure 28. One example of such selective attachment is through magnetic attraction, as known in the art. Another example will be described in detail below with reference to FIGS. 12–14.

In embodiments of the present invention, the wedge member 40 may be dimensioned slightly larger than the void created by the truncated corner of the hitch receiver attachment structure 28, if desired. Preferably, the outwardly facing engagement surface 84 is configured and dimensioned to seat within an inside corner of the hitch receiver 24. Further, in embodiments of the present invention, the angle formed between the inclined contact surface 50 and the side wall 52 and the angle formed between the contact surface 80 and a planar portion of the engagement surface 84 substantially parallel with the side wall 52 when assembled are preferably supplementary. Stated differently, in embodiments where the wedge member is seated within one corner of the hitch receiver 24, the angle formed between the contact surface 80 and the side wall 66 is substantially identical or identical to the angle formed between the inclined contact surface 50 and the adjacent side wall 52, as best shown in FIG. 4B.

It will be appreciated that the hitch receiver attachment structure 28 may be secured to, or formed integrally with, a wide variety of structures (not shown) to provide a means for securing an object to a vehicle. For example, the hitch receiver attachment structure 28 may be secured to a hitch ball assembly, a cargo carrier for carrying luggage and other loads, or to a rack configured to carry recreational equipment, such as a bicycle, snowboard, skis, etc.

Assembling the hitch assembly 20 will now be described with reference to FIGS. 1–5. First, the wedge member 40 is placed on the hitch receiver attachment structure 28 such that the wedge member contact surface 80 contacts the hitch receiver attachment structure contact surface 50. Then, the wedge member 40 and the hitch receiver attachment structure 28 are inserted together into the interior opening 46 of the hitch receiver 24 until the aperture 62 of the hitch receiver attachment structure 28 is aligned with the aperture 60 of the hitch receiver 24, as shown in FIG. 2. Due to the cooperating dimensions of the opening 46 of the hitch receiver 24 and the outer perimeter of the hitch receiver attachment structure 28, the hitch receiver attachment structure 28 loosely translates within the opening 46 of the hitch receiver 24. Then, the threaded fastener 32 is routed though the aligned apertures 60 and 62 and rotated into threaded engagement with the internally threaded nut 36, as best shown in FIG. 3. Once the hitch assembly 20 has been assembled, the hitch receiver attachment structure 28 may be securely fastened to the hitch receiver 24, thereby providing a reduction of movement between the hitch receiver attachment structure 28 and the hitch receiver 24 as compared to conventional methods known in the art.

The relative movement between the hitch receiver 24 and the hitch receiver attachment structure 28 is reduced and/or eliminated by the operation of the wedge member 40 in conjunction with the fastener assembly. To reduce or eliminate the movement between the hitch receiver 24 and the hitch receiver attachment structure 28, the threaded fastener 32 is rotated so that the hitch receiver attachment structure 28 moves from the position shown in FIG. 3, wherein the hitch receiver attachment structure 28 is loosely secured to the hitch receiver 24, to the position shown in FIG. 4A, wherein the hitch receiver attachment structure 28 is tightly secured to the hitch receiver 24. The rotation of the fastener 32 pulls the hitch receiver attachment structure 28 to the side of the fastener 32 due to the fixed nut 36. As the hitch receiver attachment structure 28 moves, to the left as shown in FIG. 4A, the contact surface 50 of the hitch receiver attachment structure 28 contacts the contact surface 80 of the wedge member 40, and due to the inclined nature of the respective surfaces, the wedge member 40, being confined by the interior corner of the hitch receiver 24, causes (i.e.; guides) the hitch receiver attachment structure 28 to slide in the direction of arrow 90, as best shown in FIG. 5.

Figure 4A:
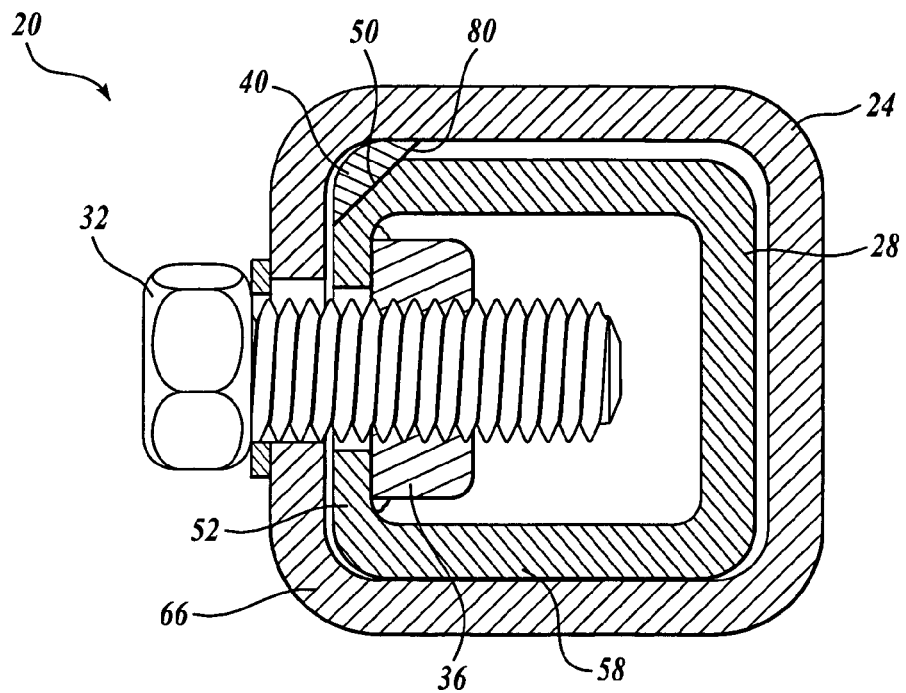
FIG. 4A is a cross sectional view of the hitch assembly of FIG. 2, wherein the hitch receiver attachment structure is tightly secured within the hitch receiver.
Figure 4B:
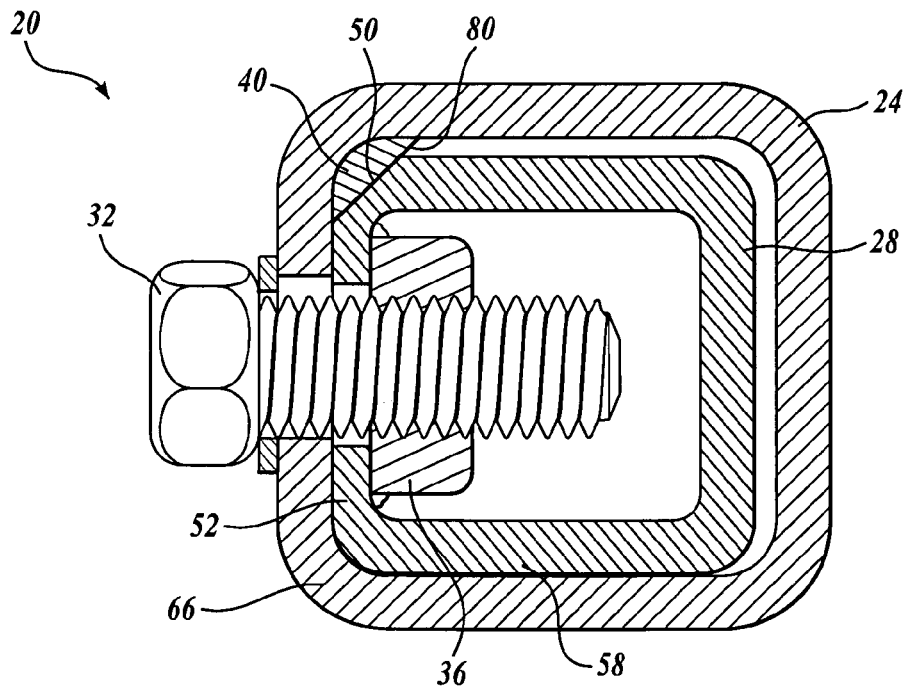
FIG. 4B is a cross sectional view of another embodiment of the hitch assembly of FIG. 2, wherein the hitch receiver attachment structure is tightly secured within the hitch receiver.
Figure 5:
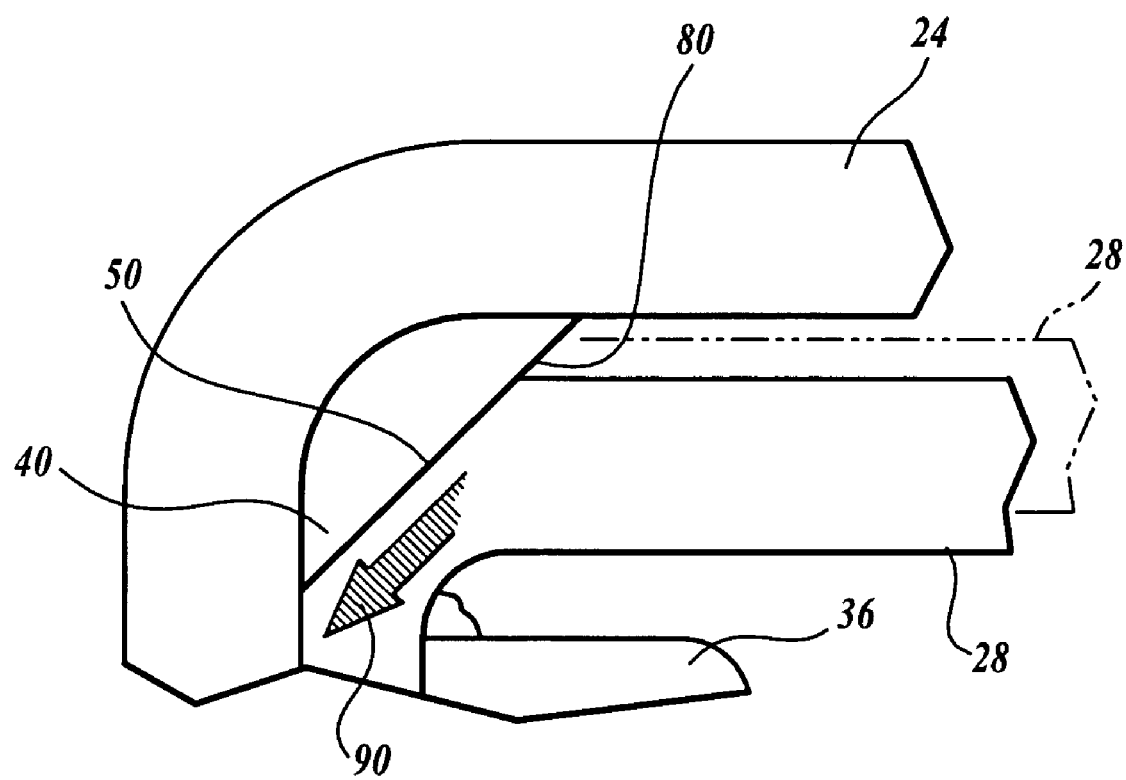
FIG. 5 is a partial cross-section view depicting the relative movement between the hitch receiver attachment structure and the wedge member.

Continued rotation of the threaded fastener 32 moves the hitch receiver attachment structure 28 in the direction of arrow 90, until side wall 58 of the hitch receiver attachment structure 28 contacts the interior surface of the hitch receiver 24, as best shown in FIG. 4A. As such, the clamping force imparted by the wedge member 40 against the contact surface 50 of the hitch receiver attachment structure 28 and the contact between the side wall 58 and the interior surface of the hitch receiver 24, reduces or eliminates excess play between the hitch receiver 24 and the hitch receiver attachment structure 28 during use. In another embodiment, as shown in FIG. 4B, the dimensions of the components may be selected such that side wall 52 as well as side wall 58 contact the respective interior surfaces of the hitch receiver 24. In this embodiment, the additional contact between the side wall 52 and the interior surface of the hitch receiver further enhances the hitch assembly's ability to reduce or eliminate excess play between the hitch receiver 24 and the hitch receiver attachment structure 28 during use.

Figure 8:
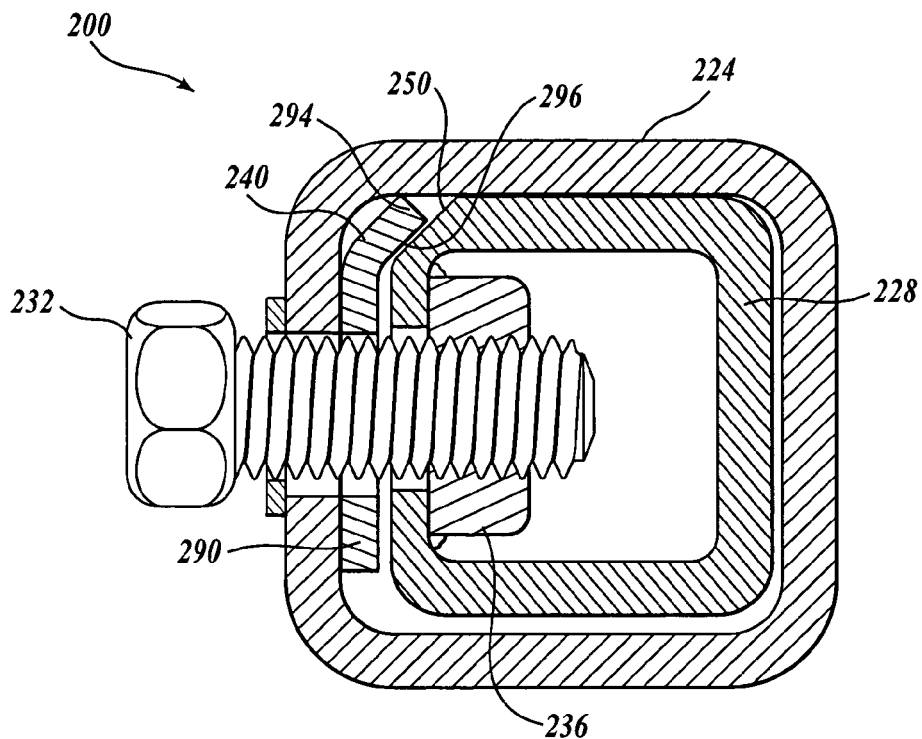
FIGS. 8 and 9 are cross-sectional views of another embodiment of a hitch assembly constructed in accordance with aspects of the present invention.
Figure 9:
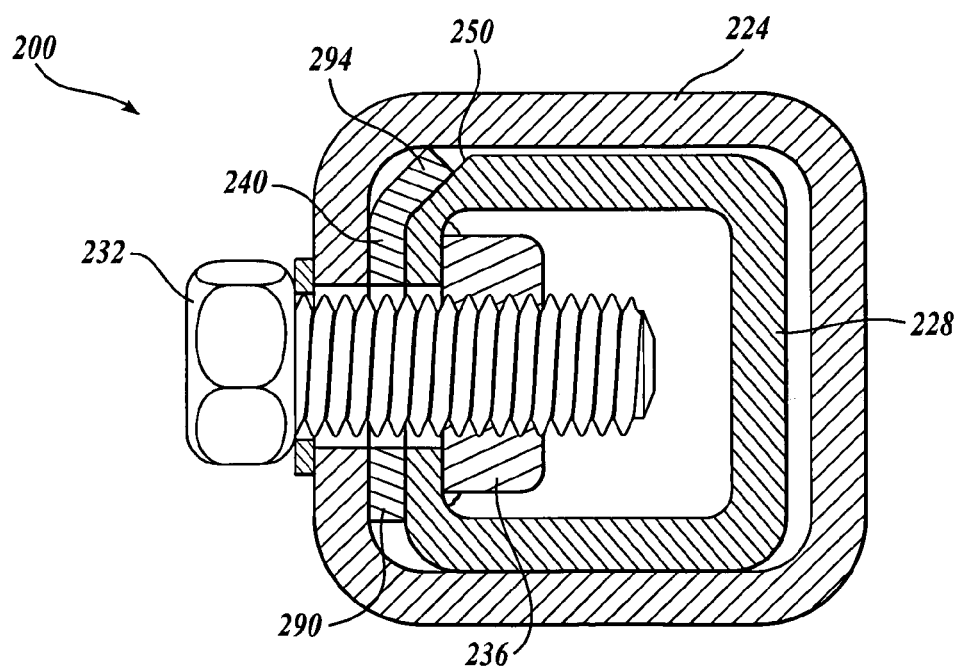

FIGS. 8 and 9 illustrate another embodiment of a hitch assembly 200 in accordance with the present invention. The hitch assembly 200 shown in FIGS. 8 and 9 is substantially identical in construction, material, and operation as the hitch assembly 20 except for the differences with will now be described in detail. As best shown in FIGS. 8 and 9, the wedge member 240 is formed as a wedge plate having a side wall portion 290 that terminates with a bent portion 294 at one end. The bent portion 294 defines an inclined contact surface 296 that engages against the contact surface 250 of the hitch receiver attachment structure 228. While the wedge plate is shown disposed adjacent to the fastener assembly, it will be appreciated that the wedge plate may have other orientations. For example, the wedge plate 240 in FIGS. 8 and 9 may be oriented such that the side wall 290 is disposed along an adjacent side wall of the fastener assembly.

Figure 12:
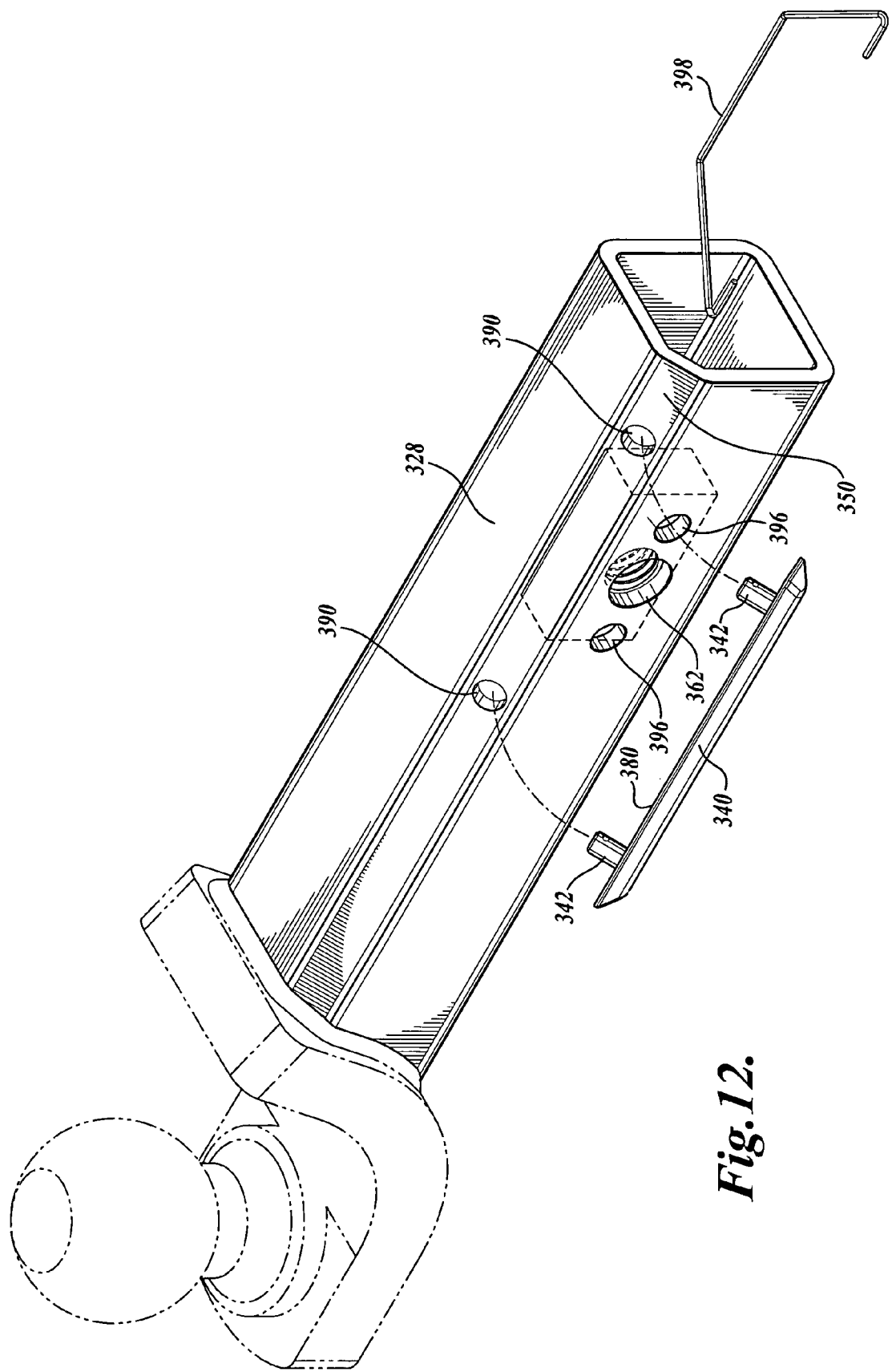
FIGS. 12–14 depict another embodiment of a hitch assembly constructed in accordance with aspect of the present invention.
Figure 13:
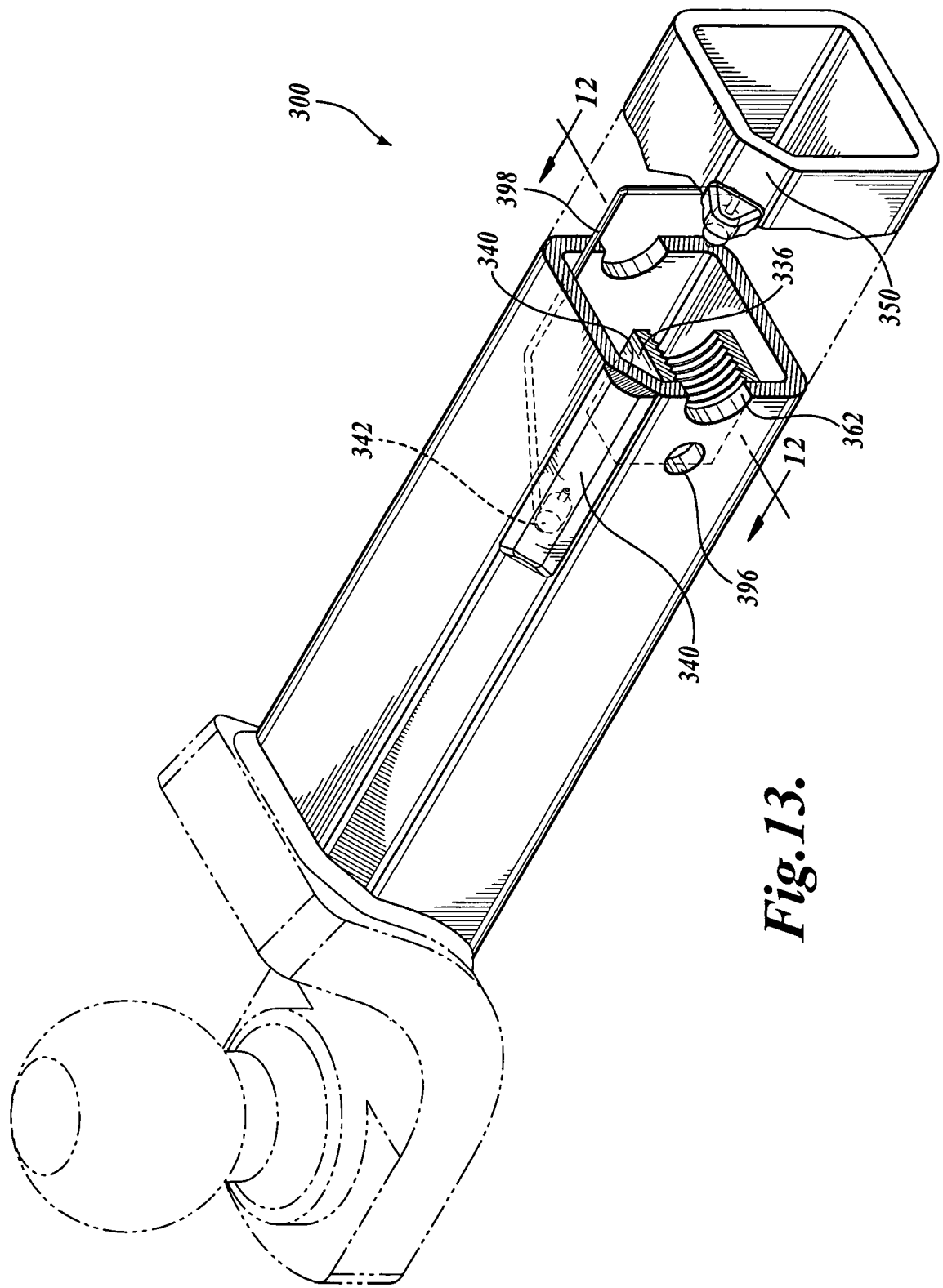
Figure 14:
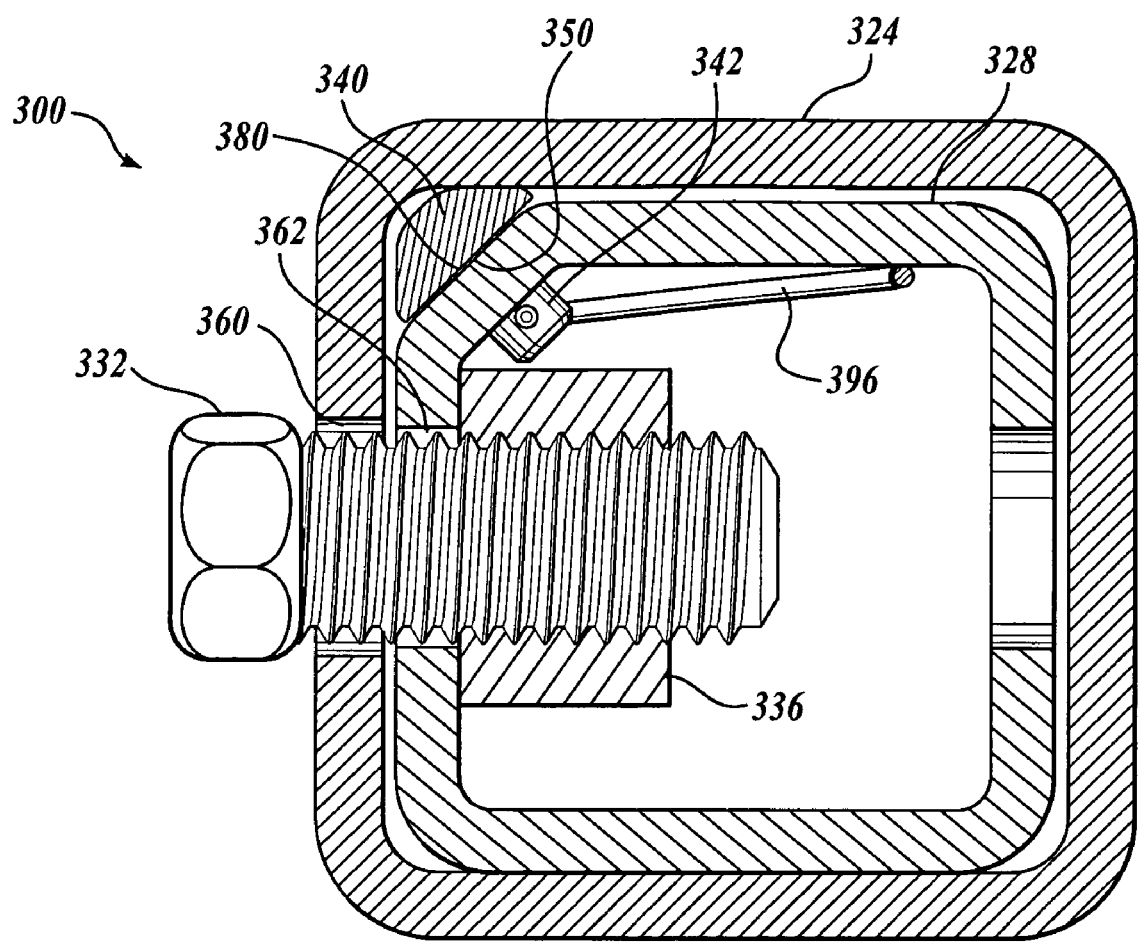

FIGS. 12–14 illustrate another embodiment of the hitch assembly 300 in accordance with the present invention. The hitch assembly 300 shown in FIGS. 12–14 is substantially identical in construction, materials and operation as the hitch assembly 20 except for the differences with will now be described in detail. As best shown in FIGS. 12–14, the wedge member 340 includes two substantially identically spaced apart posts 342, which downwardly depend from the wedge member contact surface 380. The posts 342 are configured and arranged to be cooperatively received within spaced apart apertures 390 located on the contact surface 350 of the hitch receiver attachment structure 328, as best shown in FIG. 12. The apertures 390 are slightly oversized to allow the wedge member 340 to slide laterally along the inclined contact surface 350 of the hitch receiver attachment structure 328. The wedge member 340 may be selectively retained in place on the hitch receiver attachment structure 328 with the use of a fastener, such as wire clip 398, the ends of which are routed through bores arranged transversely within the posts 342, as best shown in FIG. 13. In one embodiment, to simplify the process of welding the nut 336 to the inner surface of the hitch receiver attachment structure 328, apertures 396 are provided that flank the sides of aperture 362.

While the preferred embodiments of the invention have been illustrated and described, it will be appreciated that various changes can be made therein without departing from the spirit and scope of the invention.

The embodiments of the invention in which an exclusive property or privilege is: claimed are defined as follows:

1. A hitch receiver attachment assembly for use in a hitch assembly, comprising:
   a hitch receiver attachment structure having a generally rectangular cross-section, the hitch receiver attachment structure including one truncated corner that defines a planar contact surface that is slanted with respect an adjacent side wall surface; and
   a wedge member having an outwardly facing engagement surface configured to be cooperatively received within one corner of a hitch receiver tube and an inwardly facing planar guide surface adapted to contact the slanted contact surface of the hitch receiver attachment structure during use.

2. The hitch receiver attachment assembly of claim 1, wherein the hitch receiver attachment structure includes a first coupling structure.

3. The hitch receiver attachment assembly of claim 2, further comprising a second coupling structure cooperatively configured to be selective coupled to the first coupling structure.

4. The hitch receiver attachment assembly of claim 3, wherein the second coupling structure is an externally threaded fastener.

5. The hitch receiver attachment assembly of claim 2, wherein the first coupling structure is an internally threaded bore.

6. The hitch receiver attachment assembly of claim 1, wherein the hitch receiver attachment structure is a hitch receiver slide tube having a plurality of side walls that define an interior channel.

7. The hitch receiver attachment assembly of claim 6, wherein one of the hitch receiver slide tube side walls defines an internally threaded bore.

8. The hitch receiver attachment assembly of claim 6, further comprising an internally threaded nut disposed within the interior channel and fixed against rotation, and wherein one of the side walls of the hitch receiver slide tube defines an aperture alignable with the internally threaded nut.

9. The hitch receiver attachment assembly of claim 8, wherein the nut is welded to an inside surface of one of the hitch receiver side tube side walls.

10. The hitch receiver attachment assembly of claim 6, further comprising a plate defining an internally threaded bore, the plate slideably received within the hitch receiver slide tube interior channel.

11. The hitch receiver attachment assembly of claim 1, wherein the wedge member is a plate having a planar side wall portion and a planar bent portion defining a guide surface adapted for engagement with the hitch receiver attachment structure contact surface.

12. The hitch receiver attachment assembly of claim 1, wherein the wedge member is selectively coupled to the hitch receiver attachment structure in a slideably manner.

13. The hitch receiver attachment assembly of claim 12, wherein the wedge member is selectively coupled to the hitch receiver attachment structure by a fastener.

14. The hitch receiver attachment assembly of claim 13, wherein the hitch receiver slide structure further includes two apertures spaced a distance apart and defined by the contact surface, and wherein the wedge member includes two posts downwardly depending from the planar contact surface, the posts configured and arranged to be loosely received within the apertures and to be coupled to the fastener.

15. A hitch assembly, comprising:
   a hitch receiver tube defining a generally rectangular socket;
   a hitch receiver slide structure having a generally rectangular cross-section of suitable dimensions to loosely translate within the hitch receiver tube socket, the hitch receiver slide structure including one truncated corner that defines a planar contact surface that is slanted with respect an adjacent side wall surface;
   a wedge member having an outwardly facing engagement surface configured to be cooperatively received within one corner of the hitch receiver tube socket and an inwardly facing planar guide surface adapted to contact the slanted contact surface of the hitch receiver slide structure during use; and
   a coupling assembly that selectively couples the hitch receiver slide structure to the hitch receiver tube in a secure manner, the coupling assembly capable of clamping the hitch receiver slide structure between the wedge member and one of the hitch receiver tube side walls.

16. The hitch assembly of claim 15, wherein the hitch receiver slide structure is tube-shaped.

17. The hitch assembly of claim 15, wherein the coupling assembly includes a first coupling structure associated with the hitch receiver slide structure and accessible from a position exterior to the hitch receiver tube when assembled, and a second coupling structure cooperatively configured to be selectively coupled to the first coupling structure.

18. The hitch assembly of claim 15, wherein the wedge member is a wedge plate, the wedge plate including a planar side wall portion and a planar bent portion disposed at one end of the side wall portion, the planar bent portion defining a guide surface adapted to contact the slanted contact surface of the hitch receiver slide structure during use.

19. The hitch assembly of claim 15, wherein the wedge member is selectively coupled to the hitch receiver slide structure in a slideable manner.

20. A method for reducing or eliminating undesirable play or movement between a hitch receiver slide structure and a hitch receiver tube of a hitch assembly, the method comprising:
   proving a hitch receiver tube defining a generally rectangular socket;
   providing a hitch receiver slide structure having a generally rectangular cross-section of suitable dimensions to loosely translate within the socket of the hitch receiver tube, the hitch receiver slide structure including one truncated corner that defines a planar contact surface;
   providing a wedge member having an outwardly facing engagement surface configured to be cooperatively received within one corner of the hitch receiver tube socket and an inwardly facing planar guide surface adapted to contact the contact surface of the hitch receiver slide structure during use;

inserting the hitch receiver slide structure and the wedge member into the socket of the hitch receiver tube; and selectively coupling the hitch receiver slide structure to the hitch receiver tube in a secure manner.

21. The method of claim 20, wherein selectively coupling the hitch receiver slide structure to the hitch receiver tube in a secure manner includes moving the hitch receiver slide structure with respect to the hitch receiver tube such that the contact surface of the hitch receiver slide structure engages with and is guided by the wedge member guide surface.

22. The method of claim 20, wherein selectively coupling the hitch receiver slide structure to the hitch receiver tube in a secure manner includes engaging a threaded fastener into corresponding internally threaded structure associated with the hitch receiver slide structure;

rotating the threaded fastener so that the hitch receiver slide structure moves laterally within the hitch receiver tube socket; and tightening the hitch receiver slide structure against the hitch receiver tube by continued rotation of the threaded fastener until at least one hitch receiver slide structure side wall contacts a respective interior side wall surface of the hitch receiver tube.

* * * * *

UNITED STATES PATENT AND TRADEMARK OFFICE
CERTIFICATE OF CORRECTION

PATENT NO. : 7,004,491 B1
APPLICATION NO. : 10/830711
DATED : February 28, 2006
INVENTOR(S) : J.D. Allsop et al.

It is certified that error appears in the above-identified patent and that said Letters Patent is hereby corrected as shown below:

| COLUMN | LINE | ERROR |
|---|---|---|
| 7 | 13 | "is:" should read --is-- |
| 7 (Claim 1, line 6) | 19 | "respect an" should read --respect to an-- |
| 7 (Claim 3, line 3) | 32 | "selective coupled" should read --selectively coupled-- |
| 7 (Claim 12, line 3) | 67 | "slideably" should read --slideable-- |
| 8 (Claim 15, line 9) | 20 | "respect an" should read --respect to an-- |
| 8 | 55 | "proving" should read --providing-- |
| 9 (Claim 21, line 3) | 7 | "manner includes" should read --manner includes:-- |
| 9 (Claim 22, line 3) | 14 | "manner includes" should read --manner includes:-- |
| 10 (Claim 22, line 4) | 1 | "into corresponding" should read --into a corresponding-- |

Signed and Sealed this

Twelfth Day of September, 2006

JON W. DUDAS
*Director of the United States Patent and Trademark Office*